US009042288B2

(12) United States Patent
Calcev et al.

(10) Patent No.: US 9,042,288 B2
(45) Date of Patent: May 26, 2015

(54) SYSTEM AND METHOD FOR TRAFFIC SIGNALING AND CONTROL IN A WIRELESS NETWORK

(71) Applicant: FutureWei Technologies, Inc., Plano, TX (US)

(72) Inventors: George Calcev, Hoffman Estates, IL (US); Bin Chen, Schaumburg, IL (US); Lin Cai, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 165 days.

(21) Appl. No.: 13/690,950

(22) Filed: Nov. 30, 2012

(65) Prior Publication Data

US 2013/0142095 A1    Jun. 6, 2013

Related U.S. Application Data

(60) Provisional application No. 61/566,486, filed on Dec. 2, 2011.

(51) Int. Cl.
*H04W 28/02* (2009.01)
*H04W 28/12* (2009.01)
*H04W 52/00* (2009.01)
*H04W 52/02* (2009.01)

(52) U.S. Cl.
CPC .......... *H04W 28/02* (2013.01); *H04W 52/0219* (2013.01)

(58) Field of Classification Search
USPC .................. 370/252, 311, 328–329; 375/260; 380/270
See application file for complete search history.

(56) References Cited

U.S. PATENT DOCUMENTS

| 8,755,315 | B1 * | 6/2014 | Kukanur et al. | 370/311 |
| 2007/0058623 | A1 * | 3/2007 | Moorti et al. | 370/389 |
| 2009/0040937 | A1 * | 2/2009 | Xhafa et al. | 370/252 |
| 2009/0296619 | A1 * | 12/2009 | Sammour et al. | 370/311 |
| 2010/0303131 | A1 | 12/2010 | Trachewsky | |
| 2010/0322143 | A1 * | 12/2010 | Cai et al. | 370/315 |
| 2011/0096685 | A1 * | 4/2011 | Lee et al. | 370/252 |

(Continued)

FOREIGN PATENT DOCUMENTS

WO    WO-2011/115408 A2    9/2011

OTHER PUBLICATIONS

International Search Report and Written Opinion received in Patent Cooperation Treaty Application No. PCT/US12/67384, dated Apr. 23, 2013, 12 pages.

(Continued)

*Primary Examiner* — Edan Orgad
*Assistant Examiner* — Steven Willmore
(74) *Attorney, Agent, or Firm* — Slater & Matsil, L.L.P.

(57)    ABSTRACT

A system and method are provided for traffic signaling in wireless or sensor networks. The system and method use information or bits in a Signal Field (SIG) of Physical Layer (PHY) preamble in a packet to provide traffic control information. An embodiment method implemented by a network component comprises indicating a traffic direction and a traffic type for traffic control in a SIG in a frame and transmitting the frame including the SIG. Another method comprises receiving in a frame a SIG for traffic control that indicates a transmission type and decoding the SIG field to determine whether to process remaining information in the frame if the frame comprises data payload or a Media Access Control (MAC) header.

38 Claims, 3 Drawing Sheets

(56) References Cited

U.S. PATENT DOCUMENTS

| | | | |
|---|---|---|---|
| 2011/0149927 A1 | 6/2011 | Stacey et al. | |
| 2011/0188482 A1* | 8/2011 | Vermani et al. | 370/338 |
| 2011/0299417 A1* | 12/2011 | Nanda et al. | 370/252 |
| 2012/0201316 A1* | 8/2012 | Zhang et al. | 375/260 |
| 2012/0269123 A1* | 10/2012 | Porat et al. | 370/328 |
| 2012/0307790 A1* | 12/2012 | Wentink | 370/329 |
| 2013/0044742 A1* | 2/2013 | Zhang et al. | 370/338 |
| 2013/0044877 A1* | 2/2013 | Liu et al. | 380/270 |
| 2013/0107995 A1* | 5/2013 | Husted | 375/345 |
| 2013/0121245 A1* | 5/2013 | Vermani et al. | 370/328 |
| 2013/0223427 A1* | 8/2013 | Sohn et al. | 370/338 |
| 2014/0029681 A1* | 1/2014 | Zhang et al. | 375/260 |
| 2014/0036899 A1* | 2/2014 | Yang et al. | 370/338 |
| 2014/0105143 A1* | 4/2014 | Lee et al. | 370/329 |

OTHER PUBLICATIONS

Park, M., "IEEE P802.11 Wireless LANs," Proposed Specification Framework for TGah, Nov. 2012, pp. 1-51.
Porat, R., et al., "SIG Field Content," 20111121r1 SIG Field Content, Nov. 21, 2011, 5 pages.
Vermani, S., et al., "SIG Field Allocation," 20111121r2 Qualcomm-SIG Field allocation, Nov. 21, 2011, pp. 1-11.
"Signal Field Harmonization," Signal Field for TGah, Dec. 5, 2011, pp. 1-7.
Qi, E., et al., "SIG Field Indication for Short Frames," 20111219r0-Intel-SIGFieldIndicationforShortFrame, Dec. 19, 2011, pp. 1-6.
"Part 11: Wireless LAN Medium Access Control (MAC) and Physical Layer (PHY) specifications,"IEEE P802.11ac/D3.0, Jun. 2012, 385 pages.

\* cited by examiner

SYSTEM AND METHOD FOR TRAFFIC SIGNALING AND CONTROL IN A WIRELESS NETWORK

This application claims the benefit of U.S. Provisional Application Ser. No. 61/566,486 filed on Dec. 2, 2011, entitled "Systems and Methods for Traffic Signaling and Control in a Wireless Network," which is hereby incorporated herein by reference.

TECHNICAL FIELD

The present invention relates generally to a system and method for wireless communications and, in particular embodiments, to a system and method for traffic signaling in a wireless network.

BACKGROUND

TGah is a task group (TG) for IEEE 802.11 standard to create specifications for under 1 Gigahertz (GHz) WiFi networks and communications. The TGah WiFi specifications are designed for application in sensor networks. Another or secondary use of such WiFi communications is a scenario of traffic offloading from cellular networks to WiFi networks. One of the requirements of TGah is for an Access Point (AP) to support more than 6,000 associated devices. TGah operates at relatively narrow bandwidth, e.g., 1 and 2 Megahertz (MHz), by downclocking 20 Megahertz (MHz) WiFi implementations. This leads to increased length in a symbol duration from 4 microseconds (μs) in 20 MHz to 40 μs in 2 MHz. The power consumption is another significant factor in sensor networks. Many of the sensors are powered by battery and therefore any additional overhead may lead to shorter battery life, which can translate to additional costs in battery replacement.

In WiFi networks, the downlink traffic from an AP, e.g., a WiFi modem or router, to WiFi communications device or station (STA) is announced via a Traffic Indicator Map (TIM). Another characteristic of IEEE 802.11 of TGah (or 802.11ah) is the traffic patterns of various devices. Two main classes of devices are considered in TGah use case scenarios: the sensors and the offloading devices. The sensor networks usually have low duty cycle uplink (UL) traffic and occasionally downlink (DL) traffic, such as software uploads or some data request. The offloading devices have mainly DL traffic mixed with less UL traffic and tend to have non-uniform UL/DL short duration activity.

Information bits that are carried in WiFi communication packets or frames PHY preambles and decoded by receivers (sensor and offloading devices) are expensive (due to the limited number of bits carried in the PHY layer preamble), such as bits carried in a SIG field of a Physical Layer (PHY) preamble portion of the packet. Such information is also reliable due to its relatively low transmission rate, and therefore can be used to carry more important or crucial information. Careful design of fields or packet portions carrying such information, such as the SIG field, improves communications efficiency, such as in terms of lower power consumption.

SUMMARY OF THE INVENTION

In accordance with an embodiment, a method for traffic signaling implemented by a network component in a wireless network comprises indicating a traffic direction and a traffic type for traffic control in a Signal Field (SIG) in a frame and transmitting the frame including the SIG.

In accordance with another embodiment, a network component for traffic signaling in a wireless network, the network component comprising a processor and a computer readable storage medium storing programming for execution by the processor. The programming includes instructions to transmit a frame comprising a SIG for traffic control that indicates traffic direction and traffic type.

In another embodiment, a method that supports traffic signaling implemented by a network component in a wireless network comprises receiving in a frame a SIG for traffic control that indicates a transmission type and decoding the SIG field to determine whether to process remaining information in the frame if the frame comprises data payload or a Media Access Control (MAC) header.

In yet another embodiment, a network component that supports traffic signaling in a wireless network comprises a processor and a computer readable storage medium storing programming for execution by the processor. The programming includes instructions to receive a frame comprising a SIG for traffic control that indicates a combination of traffic and transmission type and decode the SIG field to determine whether to process remaining information in the frame if the frame comprises data payload or a MAC header.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed here are merely illustrative of specific ways to make and use the invention, and do not limit the scope of the invention.

Figure 1:
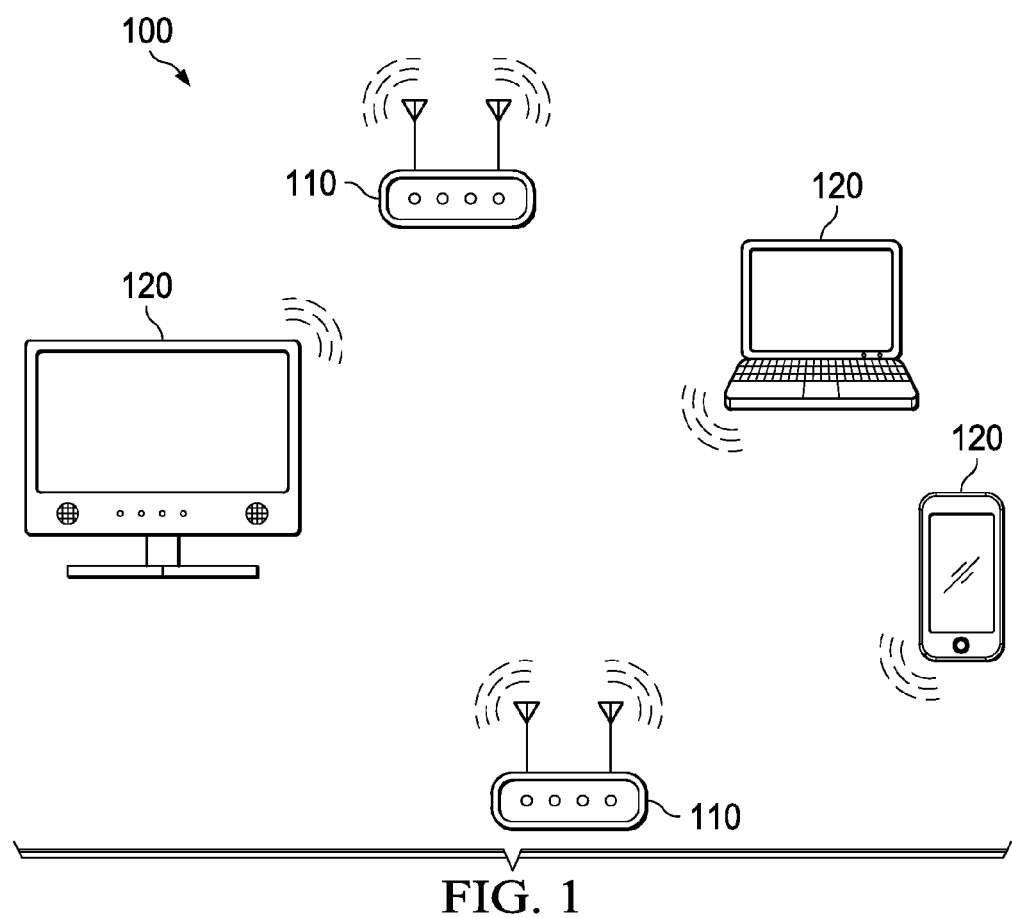
FIG. 1 shows an example of a wireless communication system.

FIG. 1 shows an example of a wireless communication system 100. The wireless communication system 100 comprises one or more access points (APs) 110 and one or more stations (STAs) 120. The APs 110 and the STAs 120 are configured to communicate according to 802.11ah standards for WiFi, both of which are incorporated herein by reference. The APs 110 include any devices configured to allow the STAs 120 access to one or more communications networks and/or service provider networks, e.g., the Internet, a WLAN, a cellular network, other networks, or combinations thereof. The APs 110 comprise wireless or radio transmitters/receivers that communicate with the STAs 120, e.g., by exchanging packets (also referred to herein as frames) according to the 802.11ah standard or other 802.11 standards (for WiFi). For example, the APs 110 include wireless routers and/or modems, such as 802.11 modems/routers. The STAs 120 include any mobile or personal communication devices configured to exchange data wirelessly with one or more networks via the APs 110. The STAs 120 also comprise wireless or radio transmitters/receivers that communicate with the APs 110, e.g., by exchanging packets based on the 802.11ah standard or other 802.11 standards (for WiFi). For example, the STAs 120 include laptop computers, tablet computers, and/or smartphones. The system 100 may also comprise one or more relays (not shown) that relay/amplify the signals between the APs 110 and the STAs 120.

According to WiFi standards, a packet or frame may include a PHY preamble, a Media Access Control (MAC) header, and data payload. The MAC header and data payload may be combined in a PHY protocol data unit (PPDU) in the packet. The PHY preamble comprises a Short Training Field (STF) for synchronization, an automatic gain control (AGC) field, a Long Training Field (LTF) for fine synchronization and channel estimation, and a Signal Field (SIG). The SIG carries a limited amount of data (e.g., bits) that are used, for example, to decode the PPDU portion of the frame (the MAC header and data payload). The different portions of the packet above are described in the 802.11 standard.

Figure 2:
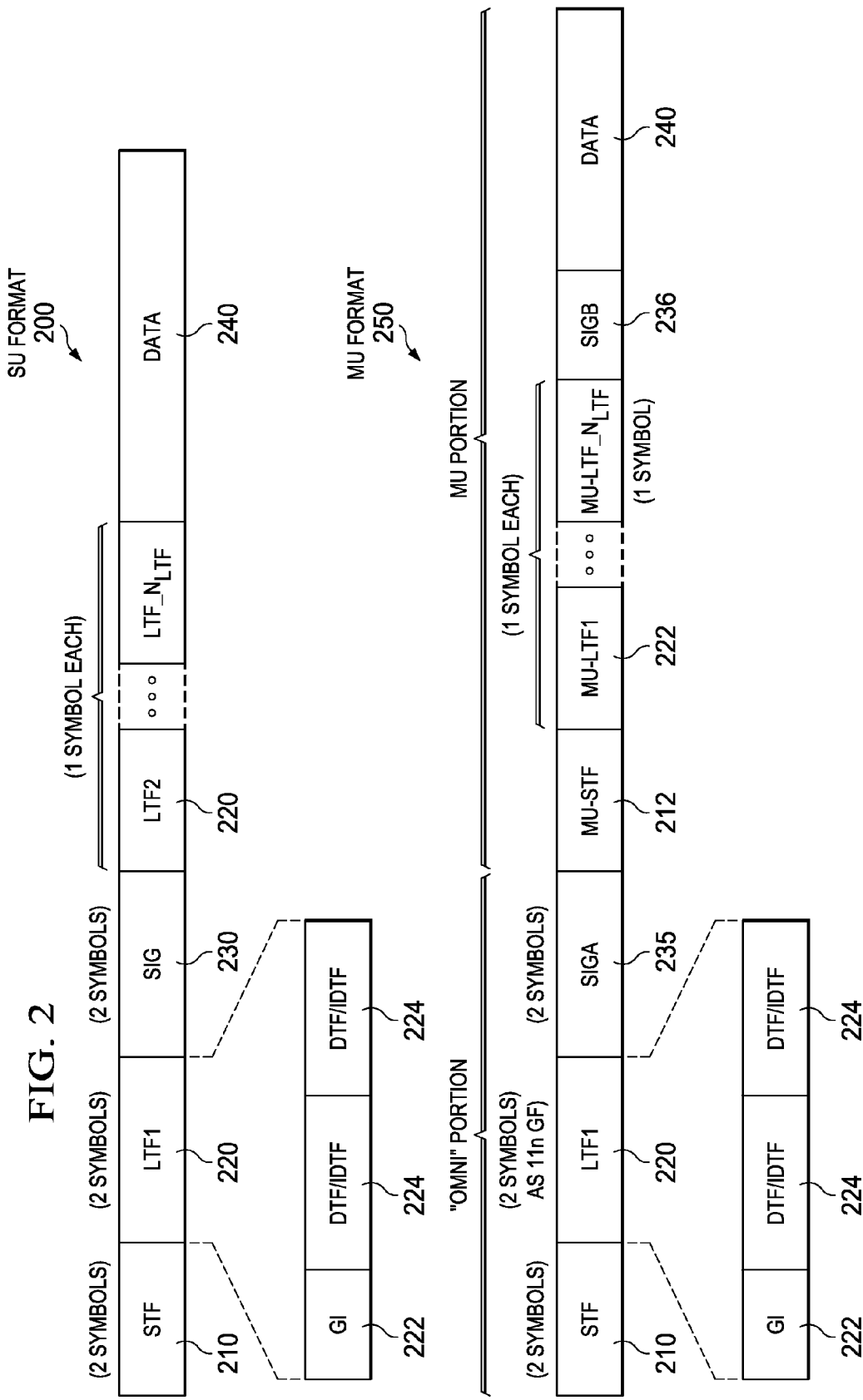
FIG. 2 shows packet formats for WiFi standard communications.

FIG. 2 shows packet formats 210 and 220 according to WiFi standards (802.11 and 802.11ah). The packet format 210 is a single user (SU) format, and the packet format 220 is a multi-user (MU) format. The SU packet format 200 includes a STF 210 comprising 2 symbols, a first LTF 220 (LTF1) comprising 2 symbols, a SIG 230 comprising 2 symbols, one or more additional LTFs 220 (LTF2 . . . LTF_$N_{LTF}$) each comprising 1 symbol, and data payload 240. The first LTF 220 includes a DGI 222 and two LTS 224 fields. The MU packet format 250 includes a STF 210 comprising 2 symbols, a first LTF 220 (LTF1) comprising 2 symbols, a SIGA 235 comprising 2 symbols, a MU-STF 212, one or more MU-LTFs 222 (MU-LTF1 . . . MU-LTF_$N_{LTF}$) each comprising 1 symbol, a SIGB 236 comprising 1 symbol, and data payload 240. The first LTF 220 includes a guard interval (GI) 222 and two discrete Fourier transform/inverse discrete Fourier transform (DTF/IDTF) periods 224.

The SIG 230 or SIGA 235 may be configured according to the IEEE 802.11ac standard, which is incorporated herein by reference. The two symbols of SIG 230 or SIGA 235 are SIG-A1 and SIG-A2 each corresponding to 1 symbol. The information in the SIG-A1 or SIG-A2 is described in Table 22-10 of the 802.11ac standard. The information bits in the SIG 230 or SIGA 235 are used by an intended receiver to decode the data in the payload 240 or by an unintended receiver to delay transmissions or to switch to sleep mode for the duration of the current packet transmission. Further, some of the information may be related to MU multiple-input and multiple-output (MIMO) transmission and/or to group identity or receiver partial association identifier (AID), as specified in 802.11ac.

In embodiments, a system and method are provided for efficient or improved traffic signaling in wireless networks, e.g., WiFi sensor networks. The system and method use information (e.g., bits) included in Physical Layer (PHY) signaling in packet to provide additional traffic control information (in comparison to current standards). The traffic control information includes indicators for traffic direction (UL/DL), intended receiver device or traffic type (sensor/offloading), transmission type (unicast/broadcast or multicast), a relayed type of traffic or direct type of traffic or combinations thereof. The traffic control information can be used to improve power saving and reduce signaling overhead in a sensor communication system, e.g., Wireless Fidelity (WiFi), Worldwide Interoperability for Microwave Access (WiMAX), High Speed Packet Access (HSPA), Long Term Evolution (LTE), Code division multiple access (CDMA), and other networks.

The system and method also include using symbol phase rotation that saves one or more additional bits in the packets to encode the traffic control information. The embodiments are described in a context of a WiFi system (according to IEEE 802.11 or 802.11ah standards) as an example, but the system and method can be used in other wireless networks or suitable communication systems (e.g., that use similar packets or data formats).

In embodiments, one or more bits in one or more SIG fields in packets (e.g., SIG 230 in SU packet 200 or SIGA 235 and/or SIGB 236 in MU packet 250) are used in the signaling for differentiation between low power and high power devices, which in the context of TGah are the sensor and offloading devices. One or more bits in the SIG field can also be used to indicate AP transmission, relay transmission, or STA transmission. The SIG filed can also include one or more bits for differentiation between DL transmissions (e.g., from a central point to terminals) and UL transmissions (e.g., from terminals to a central point). One or more bits can also be used for signaling a broadcast or unicast transmission. Additionally, one or more bits can be used for signaling a management packet or data packet, for signaling a Class 1 destination (for sensors) or Class 2 destination (e.g., for offloading devices), and/or to signal STA to STA communications, STA to AP communications, AP to STA communications, or AP to AP communications. The SIG field can include any combination of the signaling bits above. The different bit SIG signaling could be included in a subset of frames for instance management frames or data frames. For instance a bit indicating the relay information could be included in management frames or acknowledgement frames indicating the source of the frame (relay). In a different embodiment, the bit is included in a subset of management frames. This could be possible by the redefinition of the SIG potion of the preamble for various types of frames or types of traffic. The different SIG signalings can be used to for controlling power consumption of devices or STAs. The bits of the SIG field can also be used to allow devices to stop processing the rest of the data packet and go to sleep mode, or to keep out of a radio frequency (RF) channel and wait in idle mode. Other uses of the SIG signaling are described below.

Figure 3:
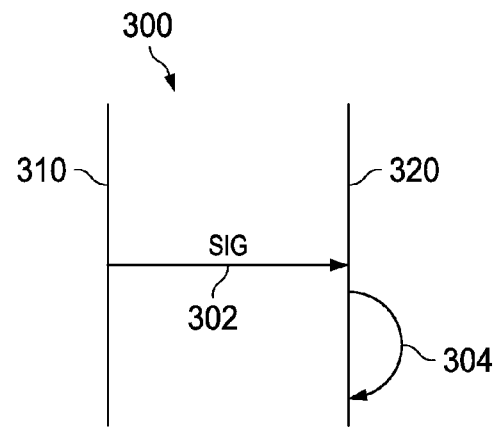
FIG. 3 is a protocol diagram for an embodiment of traffic signaling in a wireless network.
Figure 4:
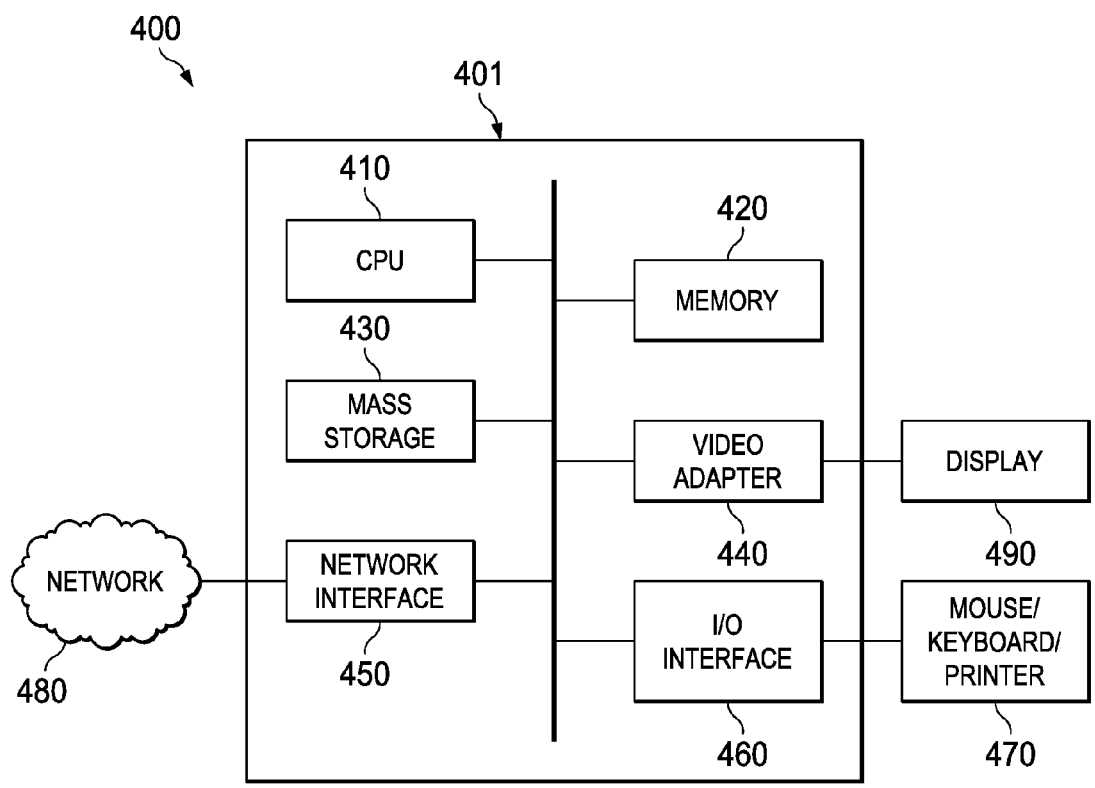
FIG. 4 is a block diagram of a processing system that can be used to implement various embodiments.

FIG. 3 shows an embodiment scheme 300 for the SIG field based signaling above to improve traffic efficiency and control. At step 302, a first network component 310 sends one or more SIG fields in one or more packets to a second network component 320 to signal any of the conditions/functionality below. Each SIG field comprises one or more bits that are used to signal one or more conditions/functionality. The first network component 310 and the second network component 320 may be any two entities in a wireless or WiFi network, such as the wireless communication system 100. The second network component 320 receives from the first network component 310 a packet 302 (e.g., a SU packet or a MU packet) including a SIG. At step 304, the second network component 320 decodes the SIG field and processes the packet based on the SIG information and the type/status of the second network component 320, as described below.

For example, the first network component 310 and the second network component 320 may be, respectively, an AP and a STA, an AP and a second AP, a STA and an AP, a STA and a second STA, an AP and a relay, a STA and a relay, a relay and an AP, or a relay and a STA. The STA may be an offload device that offloads traffic from a first wireless network (e.g., a cellular network) to a second wireless network (e.g., a WiFi network). Alternatively, the STA may be a sensor device.

In one scenario, the received SIG indicates that the packet 302 is sent from an AP (the first network component 310) for offloading class devices (or for offloading traffic type). If the SIG is received and decoded by a sensor receiver (the second network component 320), then the sensor receiver can go to sleep and wake up when the transmission is over if necessary (to send or receive data). Alternatively, if the SIG is received and decoded by an offloading device receiver (the second network component 320), then the offloading device receiver interpret another field in the packet 302 as partial AID (PAID) to determine whether to go to sleep or decode the rest of the packet.

In another scenario, the received SIG indicates that the packet 302 is sent from an AP (the first network component 310) for sensor class devices (or for sensor traffic type). If the SIG is received and decoded by a sensor receiver (the second network component 320) that did not initiate a DL transmission from an AP, then the sensor receiver can go to sleep and wake up when the transmission is over if necessary (to send or receive data). If the SIG is received and decoded by a sensor receiver that initiated a DL transmission from an AP, then the sensor receiver processes the rest of the data packet. Alternatively, if the SIG is received and decoded by an offloading device receiver (the second network component 320), then the offloading device receiver goes to sleep mode after receiving the packet 302.

In another scenario, the received SIG indicates that the packet 302 is sent from a sensor device and carries UL traffic. If the SIG is received and decoded by a relay or an AP, then the receiver decodes the packet 302. Other devices (e.g., STAs) can receive such packet 302 and go to sleep using the network address vector (NAV) setup. In one scenario, the received SIG indicates that the packet 302 is sent from an offload device and carries UL traffic. A sensor device or an offloading device (e.g., an STA) that receives such packet 302 does not process the data (or payload) in the packet 302. Alternatively, an AP that receives such packet 302 processes the packet data. In another scenario, the received SIG indicates a broadcast message to a destination class of devices (sensor or offloading devices). If one or more second network components 320 corresponding to that intended class of devices receives the packet 302, then the second network component 320 stays awake and decodes the packet. Other devices that may receive the packet 302 and do not belong to that class can go to sleep mode. In yet another scenario, the received SIG indicates AP to AP communication. If a non-AP device (e.g., a STA) receives and decodes such packet 302, then the non-AP device stops processing the packet 302 and goes to idle/sleep mode (e.g., using NAV). An AP that receives such packet 302 continues decoding the packet 302.

In the scheme 300, the SIG field may or may not include a partial AID (PAID). The SIG field may include a PAID if needed. The PAID in the SIG field is used to identify the intended receiver so that non-intended receivers can avoid decoding the rest of the packet that carries the SIG and hence save power. Typically, the PAID occupies multiple bits in a packet and thus increases the signaling overhead. In the scheme 300, the signaling overhead is reduced when the PAID field is omitted. In another embodiment, since only offloading devices, which may be a limited fraction of all registered devices, need to check the PAID in the SIG, the PAID may be included in the SIG field using fewer bits in comparison to a typical PAID field in a packet. For example, a separate PAID field in the packet may need 12 or 13 bits, while the PAID information included in the SIG field may use 8 or fewer bits.

Further, in the scheme 300, the bits indicating a DL/UL and a sensor/offloading device can also be used to indicate an identifier type in the SIG. For example, if there is an indication of a DL offloading frame, then the identifier field in the SIG is a PAID (or AID) of the receiver (or a combination of AID and basic service set identification (BSSID)). Otherwise, if the indicator indicates a UL sensor frame, then the identifier field in the SIG is a BSSID (or part of a BSSID). Alternatively, if the indicator indicates a UL offloading frame, then the identifier in the SIG is a PAID (or AID) of the transmitter. If the indicator indicates a DL sensor frame, then the identifier in the SIG is a BSSID (or part of BSSID). In other embodiment, other types of IDs may be indicated by the combination of DL/UL and sensor/offloading device.

In an embodiment, one bit in the SIG can be used to indicate a combination of traffic direction and device type. For instance, the bit is set (e.g., to 1) to indicate whether the packet is for DL transmission for one or more sensor devices, also referred to as DL sensor frame (e.g., a frame from AP or relay to a sensor). When a sensor decodes the SIG and realizes that the packet is for DL transmission for the sensor, the sensor continues decoding the rest the packet. Otherwise, the sensor can stop decoding the packet to save power. In this implementation, the PAID (or other receiver identifier) may be omitted from the SIG or included with fewer bits as described above. The receiver identifier (e.g., address) may be placed in the MAC header of the packet. Thus, by decoding the MAC header, sensors can know the intended receiver identifier. Typically, in sensor networks, DL traffic is relatively low. As such, when an offloading device in such networks realizes that this frame is for a sensor, the offloading device can stop decoding the rest of the frame. In another embodiment, the indicator bit in SIG, for instance for a relay, could be used to discriminate between concurrent transmissions of the same type of frame for instance an acknowledgement (ACK) coming from a relay versus one coming from an AP.

In another embodiment, an indicator of two bits in the SIG is used to indicate a combination of DL/UL, sensor/offloading device, and AP/STA/relay. For example, the two bits can be set to 00 to indicate a DL sensor frame from a AP or relay, 01 to indicate a DL offloading frame from a AP or relay, 10 to indicate a UL frame from a relay or STA, and 11 to indicate other combinations. Additionally, an AID field may be included in the SIG and used a one of different types of identifiers based on the indicator. For example, if the indicator indicates a DL sensor frame, then the AID field in the SIG is a BSSID (or part of a BSSID). If the indicator indicates a DL offloading frame from a AP or relay, then the AID field in the SIG may be the receiver's AID (or part of the AID or the combination of AID and BSSID). If the indicator indicates an offloading frame from a relay or STA, then the AID field in the SIG may be the transmitter's AID (or part of the AID or the combination of AID and BSSID). Otherwise, the AID field may be a BSSID.

In an embodiment, an indicator of two bits in the SIG is used to indicate a combination of DL/UL, sensor/offloading device, transmission between AP or relay and STA or between STA and STA. For example, the two bits can be set to 00 to indicate a DL sensor frame from an AP or relay to a STA, 01 to indicate an offloading frame between an AP or relay and STA, 10 to indicate an offloading frame from a STA to another STA, and 11 to indicate other combinations. Additionally, an AID field may be included the SIG and used as one of different types of identifiers based on the indicator. For example, if the indicator is 11, then the AID field in the SIG is a BSSID (or part of a BSSID). If the indicator is 01, then the AID field in the SIG may be the receiver's AID (or part of the AID or the combination of AID and BSSID). If the indicator is 10, then the AID field in the SIG may be the transmitter's AID (or part of the AID or the combination of AID and BSSID). Otherwise the AID field may be a BSSID.

In another embodiment, an indicator in the SIG is used to indicate whether the frame or packet is a sensor frame (sent from or to a sensor) or offloading frame (sent from or to an offloading device). A frame sent between an offloading device and a sensor (such as in Tunneled Direct Link Setup (TDLS) communications) is also referred to as a sensor frame. This indicator can be implemented as a modulation phase rotation in a symbol, e.g., BPSK or Quadrature BPSK (QBPSK) on one of the SIG symbols, or QBPSK or BPSK on one of the PHY Sublayer Service Data Units (PSDU) symbols. Alternatively, the indicator can be implemented as code in LTF/STF or a bit in the SIG to identify the type of the frame or packet.

For a sensor frame, the indicator may have a shorter SIG field in comparison to an offloading frame. For example, the SIG comprises 4 symbols for a sensor frame and 6 or 8 symbols for an offloading frame. In a sensor frame, a bit in the SIG may be used to indicate whether the frame is a DL frame or a UL frame. When a sensor decodes this SIG and checks the bit, the sensor continues decoding the rest of the frame if the bits indicate that the frame is a DL frame. If the bits indicate otherwise, then the sensor avoids decoding the rest of the frame. For an offloading frame, a PAID or other intended receiver identifier (e.g., address) in the SIG field may be used to indicate whether the frame is intended to an offloading device. An offloading device can check this intended receiver identifier after receiving the frame. If the offloading device is the intended receiver, the offloading device continues decoding the frame. Otherwise, the offloading device quits the decoding. Using variable SIG field length for sensor and offloading frames is efficient. For an offloading frame, the data (or payload) portion in the frame is relatively long, and hence a longer SIG does not cause a significant overhead. For a sensor frame, the data portion is relatively short, and hence a shorter SIG can substantially reduce the overhead.

In another embodiment, an indicator in the SIG is used to indicate the length of the SIG. The indicator may indicate whether the SIG is a shorter SIG or a longer SIG, where the exact length of the shorter SIG and longer SIG can be pre-defined. This indicator can be implemented as a modulation phase rotation in a symbol (e.g., QBPSK or BPSK on one of the SIG symbols, or QBPSK or BPSK on one of the PSDU symbols). Alternatively, the indicator can be implemented as a code in LTF/STF or as a bit in the SIG to identify the type of the frame. For example, the modulation phase rotation status (e.g., QBPSK or BPSK, or other types of rotation schemes) on the first two symbols or any other two symbols (e.g., the second and third symbols) of the SIG can be used to indicate the length of the SIG. A status of QBPSK and QBPSK may indicate that the SIG comprises 2 symbols. A status of QBPSK and BPSK may indicate that the SIG comprises 4 symbols. A status of BPSK and QBPSK may indicate that the SIG comprises 6 symbols. A status of BPSK and BPSK may indicate that the SIG comprises 8 symbols.

In another example, the modulation phase rotation status in 3 or more SIG symbols (e.g., the first 3 SIG symbols) can be used to indicate the length of the SIG. In yet another example, the modulation phase rotation status in one SIG symbol can be used to indicate whether the SIG is a short SIG or a long SIG. For example, a QBPSK in the first SIG symbol indicates that the SIG is a short SIG, while a BPSK in the first SIG symbol indicates a long SIG. The length of the short SIG and long SIG may be pre-defined or broadcasted on a beacon. If the length is broadcasted on a beacon, then the length of the SIG of a beacon may also have a pre-defined value, for example 4 or 6 symbols. The receiver checks the indicator in the SIG to get the length of the SIG and decode the SIG accordingly. In a scenario, an offloading frame includes a long SIG while a sensor frame includes a short SIG, e.g., to reduce overhead.

In an embodiment, a receiver (e.g., the second network component 320) may receive (e.g., from the first network component 310) a short frame or a null data packet (NDP) that comprises a PHY preamble (including a SIG) without a MAC header and data payload. In this case, after decoding or processing the PHY preamble, the receiver determines that the received frame is a short frame or a NDP that does not comprise a MAC header and data payload, and hence end frame processing. For example, the SIG in the PHY preamble may comprise a bit that is set to indicate that the frame is a short frame or a NDP that does not comprise a MAC header and data payload.

Table 1 shows an embodiment of a SIGA field (for 2 MHz communications) comprising 2 symbols. The SIGA may be sent in a SU or MU packet, such as the SIGA 235 in the MU packet format 250. The first symbol comprises 26 bits and the fields from BW to Beamformed, including a combination of 12 bits for AID. The 12 bits include 9 bits that carries AID/BSSID for SU, 1 bit for traffic direction (UL/DL), 1 bit for traffic (or device) type (sensor/offloading device), and 1 bit for transmission type. For example, the transmission type may be unicast transmission, broadcast transmission, transmission from AP to STA, relay or second AP, transmission from STA to AP, relay, or second STA, or transmission from relay to AP, STA, or second relay. The second symbol includes additional 26 bits and the fields from Aggregation bit to Tail.

TABLE 1

2 MHz, 64 point SIGA (2 symbols) that supports MU.

| Filed of SIGA | Data + Phase Bits | Comments |
| --- | --- | --- |
| BW | 2 | Indicating BW mode (2, 4, 8 or 16) |
| Reserved | 1 | |
| STBC | 1 | Same as 11ac (Alamouti like STBC on all streams or none) |
| Num SS | 2 | Number of spatial streams in SU and Nsts for the $1^{st}$ user in MU |
| AID | 12 | Carries AID/BSSID for SU 9 bits, 1 bit for direction, 1 bit for traffic type, 1 bit for transmission type |
| 'GID + Nsts' | | First 6 bits carry GID, and last 6 bits carry Nsts for $2^{nd}$, $3^{rd}$ and $4^{th}$ users |
| Reserved | 1 | |
| SGI | 1 | Short Guard Interval |
| Coding | 1 | Coding type for SU (Reserved for MU) |
| MCS | 4 | The MCS for SU case (Reserved for MU) |
| Beamformed | 1 | Tells the receiver if a Beamforming steering matrix is applied to the |

TABLE 1-continued

2 MHz, 64 point SIGA (2 symbols) that supports MU.

| Filed of SIGA | Data + Phase Bits | Comments |
|---|---|---|
| Aggregation bit | 1 | waveform in an SU transmission<br>Mainly applicable for SU, set to 1 for MU |
| Length | 9 | Length field (in symbols when aggregation is ON, is in bytes when aggregation is OFF), Mandate AMPDU for packet sizes > 511 bytes and for MU |
| Reserved | 6 | |
| CRC | 4 | 4 bits of CRC should be enough as shown in Accord discussions |
| Tail | 6 | Needed for BCC |
| Total | 52 | |

Table 2 shows another embodiment of a SIGA field (for 1 MHz communications) comprising 6 symbols. The SIGA comprises a total of 36 bits including 1 bit for indicating direction type (UL/DL), 1 bit for indicating device type (sensor/offloading), and 1 bit for indicating transmission type (unicast/multicast or broadcast).

TABLE 2

2 MHz SIGA (6 symbols) that supports
multiple features with reserved bits.

| SIG Filed | Data + Phase Bits | Comments |
|---|---|---|
| STBC | 1 | Same as 11ac |
| Num SS | 2 | Number of spatial streams for SU |
| SGI | 1 | Short Guard Interval |
| Coding | 1 | Coding type |
| Beamformed | 1 | Tells the receiver if a Beamforming steering matrix is applied to the waveform in an SU transmission |
| MCS | 4 | The MCS for SU case |
| Aggregation bit | 1 | Signal use of AMPDU |
| Length | 9 | Length field (in symbols when aggregation is ON, is in bytes when aggregation is OFF), Mandate AMPDU for packet sizes > 511 bytes |
| Reserved | 4 | |
| Direction | 1 | UL/DL |
| Traffic Type | 1 | Sensor/Offloading |
| Transmission Type | 1 | Unicast/Multicast |
| Total | 36 | |

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for traffic signaling implemented by a network component in a wireless network, the method comprising:
   indicating a traffic direction and a traffic type for traffic control in a Signal Field (SIG) in a frame; and
   transmitting the frame including the SIG, wherein a combination of the traffic direction and the traffic type is indicated by a single bit in the SIG.

2. The method of claim 1, further comprising using symbol phase rotation in the SIG to encode the single bit in the SIG to indicate the traffic direction and the traffic type.

3. The method of claim 1, wherein the traffic direction is uplink (UL) or downlink (DL), and wherein the traffic type is sensor traffic for sensor device or offloading traffic for offloading device.

4. The method of claim 1, wherein the SIG further indicates a transmission type.

5. The method of claim 4, wherein the SIG indicates that the transmission type is unicast transmission, broadcast transmission, transmission from access point (AP) to station (STA), relay or second AP, transmission from STA to AP, relay, or second STA, or transmission from relay to AP, STA, or second relay.

6. The method of claim 4, wherein the SIG indicates the transmission type by indicating that the frame is sent from an AP, a relay, a STA, a sensor device, or an offloading device.

7. The method of claim 4, wherein the transmission type is indicated by one or more bit in the SIG.

8. The method of claim 4, wherein a combination of the traffic direction, the traffic type, and the transmission type is indicated by two bits in the SIG.

9. The method of claim 1 further comprising using symbol phase rotation in the SIG to encode one or more bits or symbols in the SIG to indicate the traffic direction, the traffic type, and a transmission type.

10. The method of claim 9, wherein two or three symbols in the SIG are encoded using symbol phase rotation to indicate the traffic direction, the traffic type, and the transmission type.

11. The method of claim 1 further comprising indicating a management frame or a data frame by one or more bits in the SIG.

12. The method of claim 1 further comprising indicating a length of the SIG.

13. The method of claim 12, wherein indicating the length of the SIG comprises indicating a short SIG or a long SIG, and wherein the short SIG and the long SIG have pre-defined lengths.

14. A network component for traffic signaling in a wireless network, the network component comprising:
   a processor; and
   a non-transitory computer readable storage medium storing programming for execution by the processor, the programming including instructions to:
      transmit a frame comprising a Signal Field (SIG) for traffic control, wherein a combination of a traffic direction and a traffic type is indicated by a single bit in the SIG.

15. The network component of claim 14, wherein the SIG further indicates a transmission type.

16. The network of claim 14, wherein the SIG excludes an association identifier (AID) or a partial AID (PAID).

17. The network component of claim 14, wherein the SIG comprises an association identifier (AID) or partial AID (PAID).

18. The network component of claim 17, wherein the SIG indicates that the AID or PAID is at least part of a basic service set identification (BSSID), at least part of a receiver AID or combination of receiver AID and BSSID, or at least part of a transmitter AID or combination of transmitter AID and BSSID.

19. A method that supports traffic signaling implemented by a network component in a wireless network, the method comprising:
receiving in a frame a Signal Field (SIG) for traffic control that indicates a transmission type, wherein a combination of a traffic direction and a traffic type is indicated by a single bit in the SIG; and
decoding the SIG to determine whether to process remaining information in the frame when the frame comprises data payload or a Media Access Control (MAC) header.

20. The method of claim 19 further comprising entering a sleep mode after decoding the SIG if the network component is a sensor device and the transmission type indicates that the frame is sent from an access point (AP) to one or more offloading devices.

21. The method of claim 19 further comprising interpreting another field in the frame as a partial association identifier (AID) after decoding the SIG if the network component is an offloading device and the transmission type indicates that the frame is sent from an access point (AP) to one or more offloading devices.

22. The method of claim 19 further comprising entering a sleep mode after decoding the SIG if the network component is an offloading device and the transmission type indicates that the frame is sent from an access point (AP) to one or more sensor devices.

23. The method of claim 19 further comprising entering a sleep mode after decoding the SIG if the network component is a sensor device that did not initiate a downlink transmission and the transmission type indicates that the frame is sent from an access point (AP) to one or more sensor devices.

24. The method of claim 19 further comprising processing the rest of the frame after decoding the SIG if the network component is a sensor device that initiated a downlink transmission and the transmission type indicates that the frame is sent from an access point (AP) to one or more sensor devices.

25. The method of claim 19 further comprising decoding the frame after decoding the SIG if the transmission type indicates that the frame is a broadcast frame to a destination class of devices and the network component belongs to the destination class of devices.

26. The method of claim 19 further comprising entering a sleep mode after decoding the SIG if the transmission type indicates that the frame is a broadcast frame to a destination class of devices and the network component does not belong to the destination class of devices.

27. The method of claim 19 further comprising decoding the frame after decoding the SIG if the network component is an access point (AP) or relay and the transmission type indicates that the frame is sent from a sensor device and carries uplink traffic.

28. The method of claim 19 further comprising entering a sleep mode after decoding the SIG if the network component is not an access point (AP) or relay and the transmission type indicates that the frame is sent from a sensor device and carries uplink traffic.

29. The method of claim 19 further comprising decoding the frame after decoding the SIG if the network component is an access point (AP) and the transmission type indicates that the frame is sent from an offloading device and carries uplink traffic.

30. The method of claim 19 further comprising discarding the frame after decoding the SIG if the network component is a sensor device or offloading device and the transmission type indicates that the frame is sent from a sensor device and carries uplink traffic.

31. The method of claim 19 further comprising entering a sleep mode after decoding the SIG if the transmission type indicates access point (AP) to AP transmission and the network component is not an AP.

32. The method of claim 19 further comprising decoding the frame after decoding the SIG if the transmission type indicates access point (AP) to AP transmission and the network component is an AP.

33. The method of claim 19 further comprising ending frame processing if the frame is a short frame or a null data packet (NDP) that does not comprise data payload or a Media Access Control (MAC) header.

34. A network component that supports traffic signaling in a wireless network, the network component comprising:
a processor; and
a non-transitory computer readable storage medium storing programming for execution by the processor, the programming including instructions to:
receive a frame comprising a Signal Field (SIG) for traffic control that indicates a combination of traffic and transmission type, wherein a combination of a traffic direction and a traffic type is indicated by a single bit in the SIG; and
decode the SIG to determine whether to process remaining information in the frame if the frame comprises data payload or a Media Access Control (MAC) header.

35. The network component of claim 34, wherein the SIG comprises a partial association identifier (PAID) comprising 8 or fewer bits.

36. The network component of claim 34, wherein the SIG comprises an identifier field.

37. The network component of claim 36, wherein the combination of traffic and transmission type indicate a type of the identifier field as at least part of a basic service set identification (BSSID) or at least part of an association identifier (AID) or partial AID (PAID).

38. The network component of claim 34, wherein the programming further includes instructions to end frame processing if the frame is a short frame or a null data packet (NDP) that does not comprise data payload or a Media Access Control (MAC) header.

* * * * *